United States Patent [19]

Smorzaniuk et al.

[11] Patent Number: 4,696,649

[45] Date of Patent: Sep. 29, 1987

[54] IN-LINE CONNECTOR

[75] Inventors: Adam Smorzaniuk, Oxford; Larry N. Siebens, Whippany, both of N.J.

[73] Assignee: Amerace Corporation, Hackettstown, N.J.

[21] Appl. No.: 781,022

[22] Filed: Oct. 18, 1985

[51] Int. Cl.⁴ .............................................. H01R 4/66
[52] U.S. Cl. .................................. 439/98; 174/71 R; 174/78; 29/868
[58] Field of Search ................. 339/14 R, 14 L, 97 R, 339/253 L, 252 L, 266 G, 266 L; 174/71 R, 78; 29/868

[56] References Cited

U.S. PATENT DOCUMENTS 3,209,067  9/1965  Channell et al. ............. 339/14 L X Primary Examiner—Eugene F. Desmond
Attorney, Agent, or Firm—David Teschner

[57] ABSTRACT

A surface mounted grounding connector and method for installing same to the bared shield of a jacketed, shielded cable from which a portion of the jacket has been removed, without severing the shield and reestablishing the moisture protection of the shield. The connector is made up of a contact means placed atop the bared shield and engageable therewith to prevent relative movement of said contact means with respect to said shield. A copper braid is first engaged with said contact means and then wrapped about both said contact means and bared shield to establish a good electrical joint and held in place with a suitable clip.

A preformed liquid-tight sealing form has a grounding conductor inserted through a suitable aperture therein and the bared conductor crimped in the crimpable connector attached to the contact means. The form is then moved into position such that its stem fits tightly about the ground conductor and crimpable connector and skirt overlies the contact means and bared shield. Finally an insulating tape or mastic is wrapped about the joint to complete a moisture-proof seal of the grounding conductor and shield.

17 Claims, 20 Drawing Figures

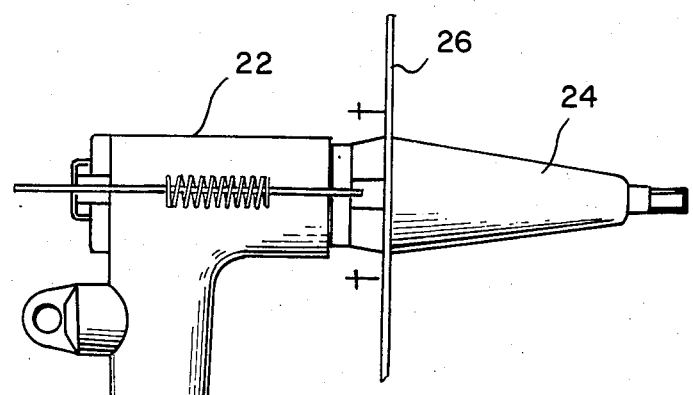
FIG. 1
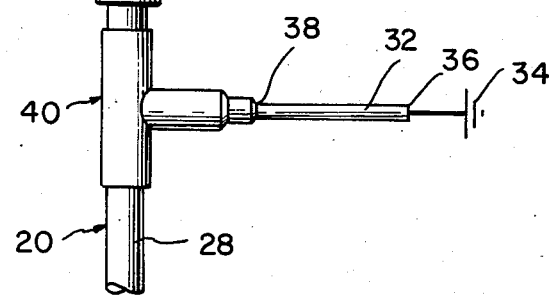
FIG. 2
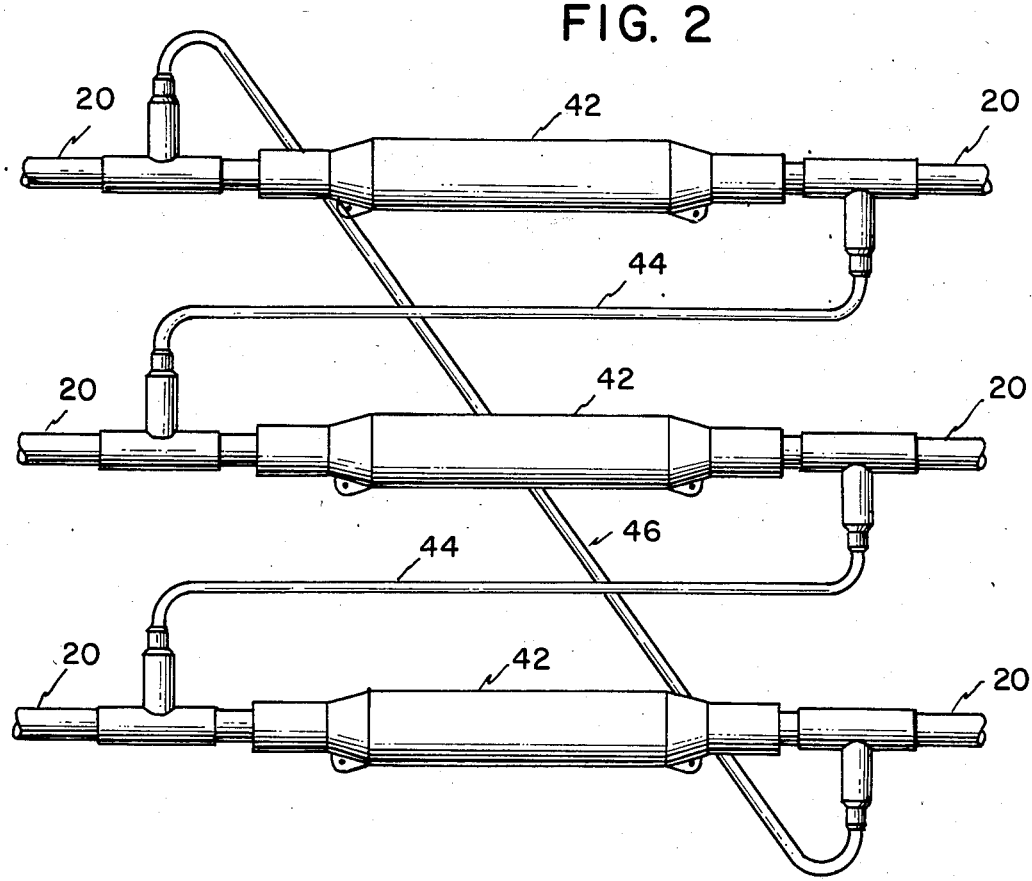

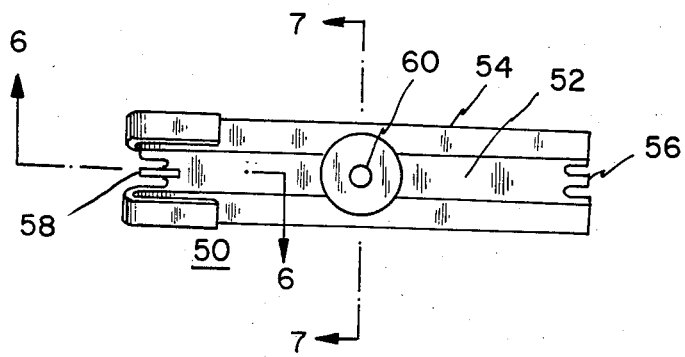
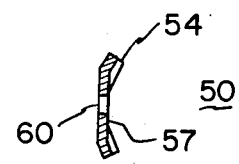
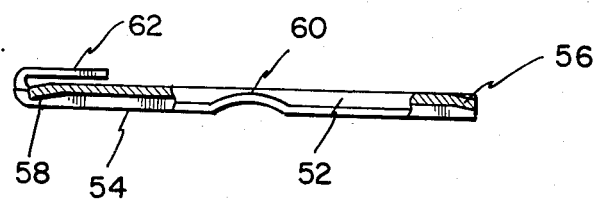
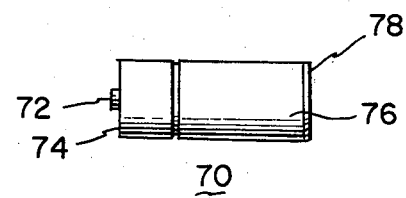
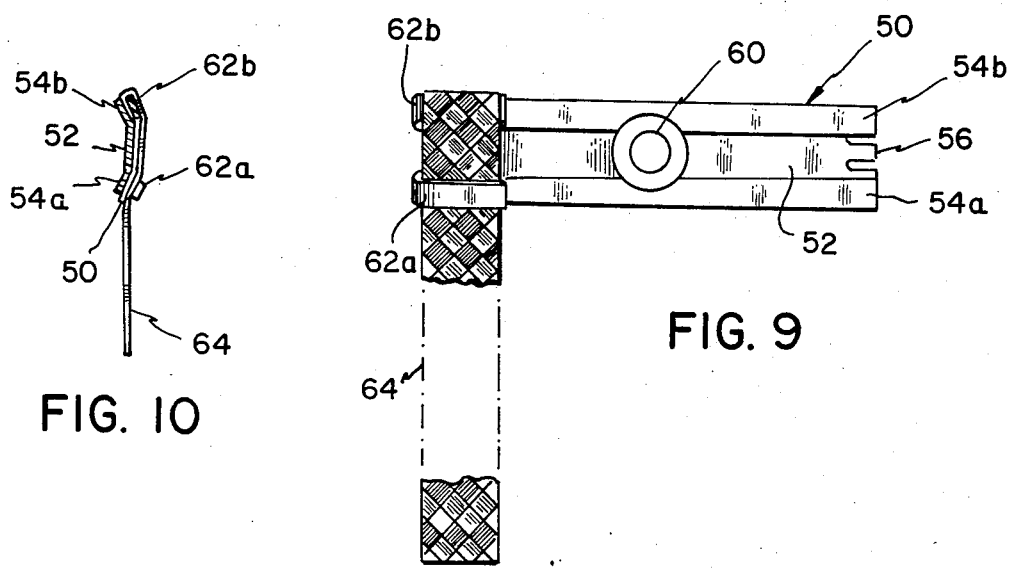

IN-LINE CONNECTOR

BACKGROUND OF THE INVENTION

Where jacketed concentric neutral high-voltage power cable is employed over long distances, there exists a requirement to ground the concentric neutral at regular intervals, for example, each ¼-mile of the cable run. Concentric neutral high-voltage power cables are jacketed to protect such concentric neutral wires from moisture and the resultant corrosion common with unjacketed high-voltage power cables. In order to make the necessary ground connection the jacket must be breached, the ground conductor attached to the concentric neutral shield and the joint moisture sealed. The present invention is directed to method and apparatus for attaching a ground conductor to the concentric neutral shield of a high-voltage power cable and insulating the resulting joint to protect it from the effects of moisture, dirt and other elements in the environment about the joint.

FIELD OF THE INVENTION

The invention is directed to the field of cable shield grounding and more particularly to the grounding of the concentric neutral of a jacketed, shielded, high voltage electrical cable and insulating the joint to restore the integrity of the jacket to prevent the intrusion of moisture which could lead to the destruction of the concentric neutral shield.

DESCRIPTION OF THE PRIOR ART

The prior art shows some of the components disclosed herein individually and some even combine a few of them but none includes all of the disclosed components assembled as described, illustrated and taught herein to achieve the novel arrangement disclosed and claimed.

U.S. Pat. Nos. 3,676,836; 4,080,024 and 4,176,893 issued respectively on Jul. 11, 1972, Mar. 21, 1978 and Dec. 4, 1979, each disclose a saddle to contact an exposed shield but each employ a screw-type fastener to receive a ground lead but fail to disclose the preform or any other means to achieve a moisture-proof joint.

U.S. Pat. Nos. 3,192,377 issued Jun. 29, 1965; 3,312,777 issued Apr. 4, 1967; and 4,384,167 issued May 17, 1983 show saddles to guide out wires from a wire bundle but do not show how the wires can be joined in any manner without severing and also no means to moisture-proof the completed joint is disclosed.

Finally, U.S. Pat. Nos. 419,365 issued Jan. 14, 1890; 3,248,475 issued Apr. 26, 1966 and 3,347,976 issued Oct. 17, 1967 show taps or connections made by physical connection to a conductor also without moisture seal.

SUMMARY OF THE INVENTION

The present invention overcomes the difficulties noted above with resect to the prior art devices by providing a device for grounding the concentric neutral of a jacketed high voltage cable without severing the concentric neutral and sealing the resulting joint to provide a moisture-proof joint to prevent the intrusion of moisture, dirt or other contaminants into such joint.

The jacket of a jacketed, concentric neutral high-voltage cable is removed for a prescribed length to expose the concentric neutral wire shield below. A conductive saddle with at least one tab at each end is positioned atop the shield with the tabs engaging the shield wires to prevent relative rotation between the saddle and cable shield. Affixed to the saddle is a coupling means which may take the form of a crimpable connector having a cavity exposed to one end to receive the bared end of a ground conductor. A copper braid is wound about the saddle and the shield to insure a good electrical contact there between. A clip, having a segmented end and serrations along the engaging edge, is slipped over the braid to prevent its becoming unwrapped.

A preformed moisture seal having a skirt and a stem portion has a ground conductor threaded through the aperture in the stem and the bared end of such ground conductor is placed in the cavity of said crimpable connector which is then crimped to retain said ground conductor end therein. The preform is then moved into position so that the stem surrounds and contains the crimpable connector and engages the outer perimeter of the ground conductor. The skirt of the preform is brought into contact with the saddle and exposed, bared shield and held tightly in place by one or more layers of tightly wound jacketing or mastic tape. It is, therefore, an object of this invention to provide a moisture-proof joint between a grounding conductor and the concentric neutral of a jacketed concentric neutral high voltage cable.

It is an object of this invention to provide a moisture-proof joint between a grounding conductor and the concentric neutral shield of a jacketed concentric neutral high voltage electrical cable without severing said concentric neutral shield.

It is an object of this invention to provide a moisture-proof joint between a grounding conductor and the concentric neutral shield of a jacketed concentric neutral high voltage electrical cable which requires only the removal of the jacket in the area of the joint only and permits the joint to be made without severing the neutral wires.

It is another object of this invention to provide a moisture-proof joint between a grounding conductor and the concentric neutral shield of a jacketed concentric neutral high voltage electrical cable employing a preformed moisture seal form having a stem portion to protect the joint with a grounding conductor and a skirt to protect the joint with the bared concentric neutral shield.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWINGS

In the drawings in which similar elements are given similar reference characters:

FIG. 1 is a side elevational view of the joint between an elbow and bushing of a high voltage system and a moisture-proof ground connection between a grounding conductor and the concentric neutral of a jacketed high voltage cable according to the concepts of the invention.

FIG. 2 is a top plan view of the cross-phasing of the three conductors of a three-phase high voltage system and showing multiple moisture-proof ground connections between grounding conductors and the concentric neutrals of various jacketed high voltage cables each according to the concepts of the invention.

FIG. 5 is a top plan view of the contact means or saddle of FIG. 4.

FIG. 6 is a sectional view of the saddle taken along the line 6—6 in FIG. 5.

FIG. 7 is a section of the saddle taken along the line 7—7 in FIG. 5.

FIG. 8 is a side elevation of the crimpable connector of the instant invention.

FIG. 9 is a top plan view of the sub-assembly of the saddle and braid of the instant invention.

FIG. 10 is a front elevation thereof looking to the right in FIG. 9.

DESCRIPTION OF THE PREFERRED EMBODIMENTS

Figure 3:
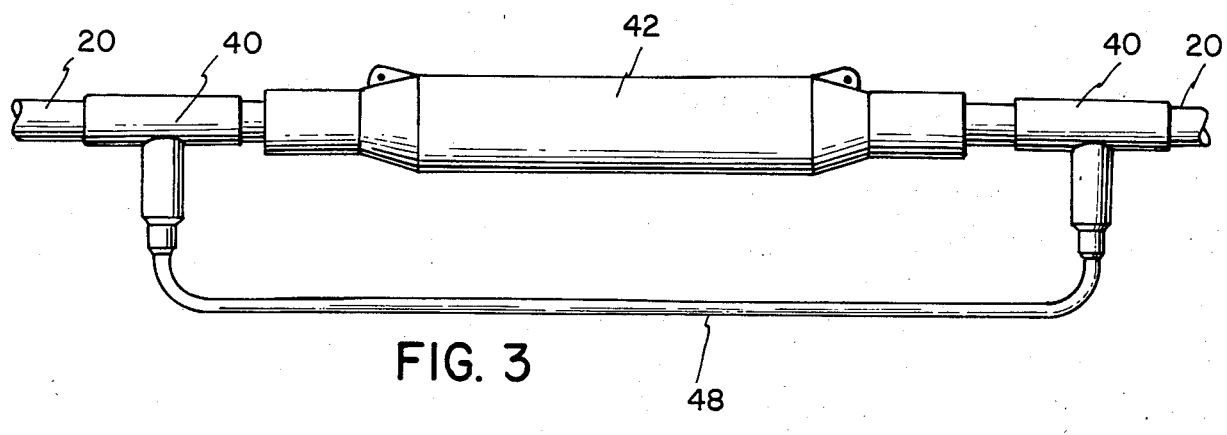
FIG. 3 is a side elevational view of splice jumping of the concentric neutrals of the two jacketed concentric neutral cables joined by the splice illustrated and showing moisture-proof connections according to the concepts of the invention.

FIG. 1 shows a typical jacketed, concentric neutral high-voltage cable 20 connected to an elbow 22 which in turn is plugged into a bushing insert 24 positioned on a cabinet wall 26. Below the jacket 28 of cable 20 is the concentric neutral layer which may take the form of a loose braid of metallic conductors or a wound metallic type (not shown). As stated above, jacketed concentric neutral cable must be grounded at regular distances and FIG. 1 shows cable 20 concentric neutral being grounded just prior to its entry into elbow 22. A grounding conductor 32 connected to ground 34 at a first end 36 and is coupled as at 40 to cable 20 at its second end 38 in the manner to be described in detail below.

The concentric neutrals of six cables 20, joined in pairs by splices 42, are joined by three grounding conductors 44, 46 as shown in FIG. 2. Not shown is a further grounding conductor joining the commoned concentric neutrals to ground. FIG. 3 shows the use of a grounding conductor 48 to carry the concentric neutrals around a splice 42 using two joints 40 of the type disclosed herein.

Turning now to FIGS. 4 to 16 the various components and the method of their assembly to produce the joint 40 between the concentric neutral of a high voltage cable 20 and a grounding conductor 32 is shown. Firstly, a portion of the jacket 28 of cable 20 is removed to expose the concentric neutral conductors 30. Although, a braid of conductors 30 is shown as the concentric neutral, this can also take the form of a wound metallic tape without requiring any change in the invention. The amount of jacket 28 removed will depend upon the length of the saddle 50 employed. Also, the jacket will be removed about the entire periphery of the cable 20 for the chosen length.

Saddle 50 is intended to make direct, intimate contact with the concentric neutral and does not require such neutral to be severed or otherwise disturbed. As shown in FIGS. 5, 6 and 7, saddle 50 is made of a flat strip of metallic stock having a flat central portion 52 and inclined marginal areas 54 which allows the saddle 50 to conform more closely to the cable configuration. Down-turned tabs 56 and 58 are permitted to engage individual ones of the concentric neutral wires to fix saddle 50 in position and prevent relative movement of the saddle 50 with respect to cable 20 during the ensuing steps of the procedure. An aperture 60 is arranged to receive annular tab 72 at first end 74 of crimpable connector 70 (see FIG. 8). Crimpable connector 70 has a bore 76 extending inwardly from a second end 78 towards first end 74. To join the crimpable connector 70 to saddle 50, the annular tab 72 is inserted in aperture 60 of the saddle 50 and the upper surface of central portion 52 is brazed, welded, soldered or the like to the first end 74 of crimpable connector 70. This ensures a good mechanical and electrical joint between the saddle 50 and crimpable connector 70 and similarly a good mechanical and electrical joint between a grounding conductor placed in bore 76 with crimpable connector 70 crimped in well-known fashion securely to it and the concentric neutral upon which saddle 50 is placed.

Adjacent tab 58, the marginal areas 54 are folded back upon themselves to form open-ended loops 62 for the receipt of the copper braid 64 as now described. Copper braid 64 is a multi-layer woven fabric of copper strands arranged to maintain its integrity and to provide good electrical conductivity. The width and thickness of the braid, as well as the diameter of the strands of copper wire used, are chosen so that the braid 64 can be readily wound about the saddle 50 and exposed neutral conductors 30. Braid 64 will be made long enough to give at least one layer of coverage of exposed concentric neutral conductors 30. To prevent separation of braid 64 from saddle 50, the braid 64 is threaded about the loops 62 as shown in FIGS. 9 and 10. Braid 64 is started adjacent marginal area 54a run across the top surface of the saddle 50 under loop 62b and then doubled back over loop 62b and the surface of braid 64 under loop 62a and continuing perpendicular to saddle 50. Loops 62a and 62b can be depressed to assist in retaining the joint between braid 64 and saddle 50.

Figure 4A:
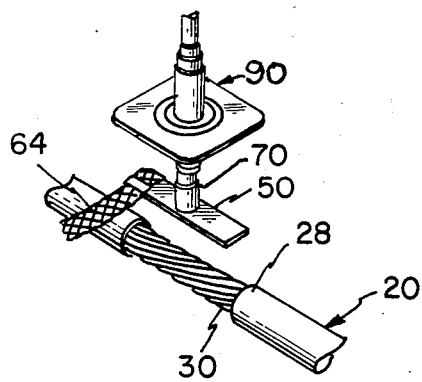
FIGS. 4A to 4E are a sequential series of figures illustrating the major steps in carrying out the installation of the grounding conductor to the concentric neutral shield of a jacketed, concentric neutral high-voltage electrical cable according to the invention.
Figure 4B:
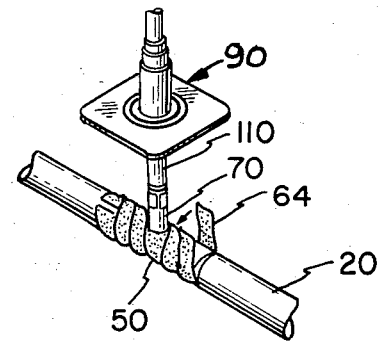
Figure 4C:
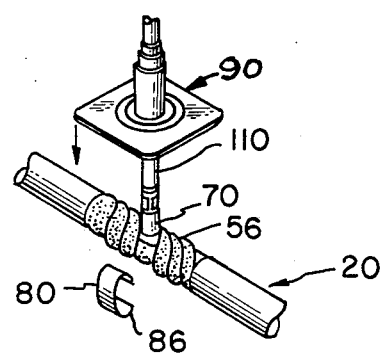
Figure 4D:
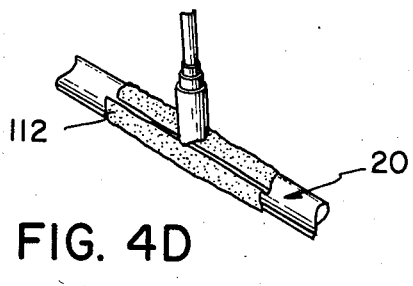
Figure 4E:
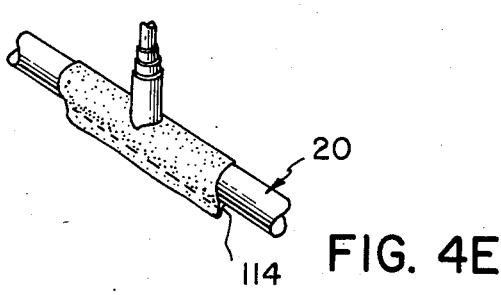
Figure 11:
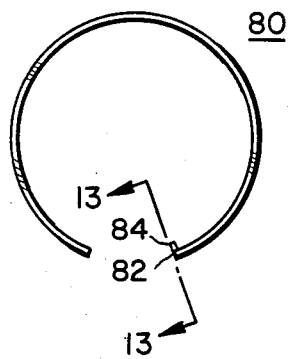
FIG. 11 is a side elevation of the spring clip of the instant invention.
Figure 13:
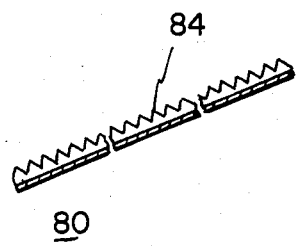
FIG. 13 is a front elevation, partly in section of the engagement edge of the clip of FIG. 11 taken along the lines 13—13 in FIG. 11.
Figure 16:
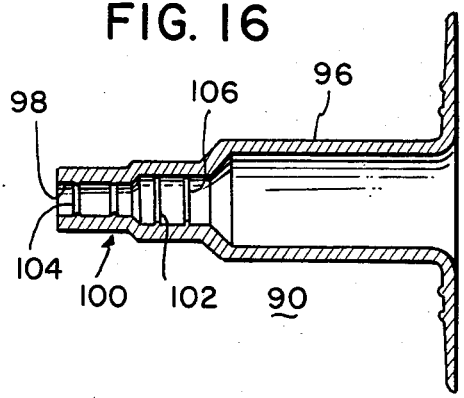
FIG. 16 is a side elevation, partly in section, of the preformed liquid sealing form of FIG. 14 taken along the lines 16—16 in FIG. 14.
Figure 12:
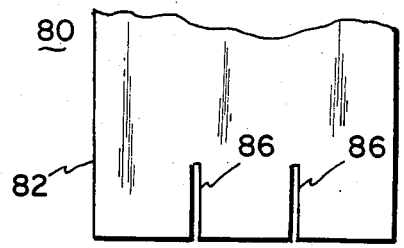
FIG. 12 is a fragmentary top plan view of a portion of the engagement end of the clip of FIG. 11.
Figure 14:
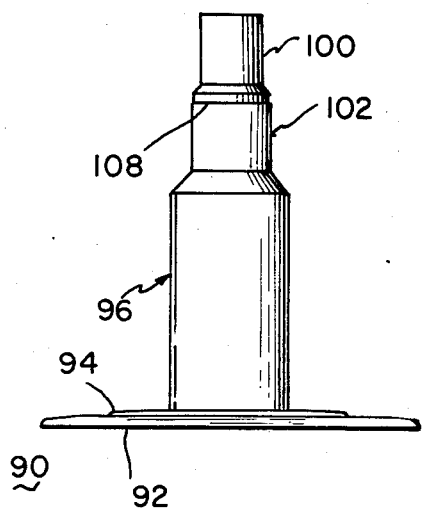
FIG. 14 is a side elevation of the preformed liquid sealing form of the instant invention.
Figure 15:
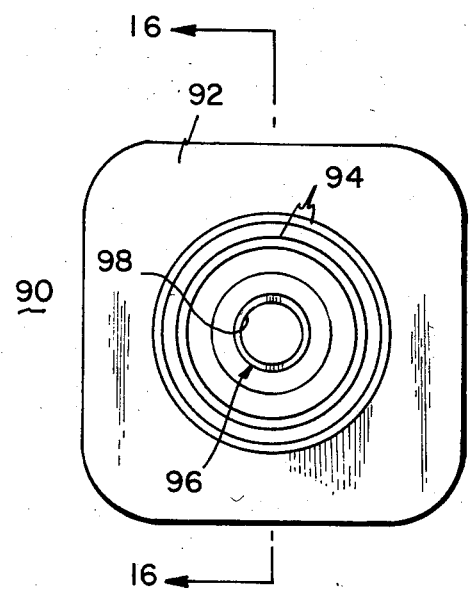
FIG. 15 is a top plan view of the preformed liquid sealing form of FIG. 14.

Once the braid 64 and the saddle 50 have been assembled as shown in FIGS. 9 and 10, saddle 50 is positioned over the concentric neutral conductors 30 (FIG. 4(A)), braid 64 is wound about saddle 50 and concentric neutral conductors 30. The turns of braid 64 are so distributed that they cover substantially the entire length of saddle 50 with spacing determined by the length of braid 64 (FIG. 4(B)).

To hold braid 64 in place the spring clip 80 (see FIGS. 11, 12 and 13) is employed. Spring clip 80, made of a suitable spring temper stock such as beryllium copper, is formed into a generally circular configuration with the free ends 82 turned radially inwardly towards the center of curvature of the spring clip. The free edge 84 the ends 82 are serrated (see FIG. 13) to permit gripping the braid 64 and the ends 82 are segmented as at 86 (see FIG. 12) to allow the clip 80 to compensate for local variations in braid thickness. The clip 80 is installed as at (C) in FIG. 4 at the end of the braid 64 to keep same from unwinding. The clip 80 being split allows it to operate with cables of different thicknesses and permits the joint to expand or contract along with the cable as it heats and cools and insures an intimate electrical contact throughout the cable operating cycles.

A preformed liquid sealing form 90 (see FIGS. 14, 15 and 16) is employed to provide a liquid, dirt, contaminant seal about the joint to be made between a grounding conductor and the crimpable connector 70 attached to the saddle 50. Preform 90 has a skirt 92 having two raised "O" rings 94 concentric with the centrally located stem 96. The dimensions of the skirt 92 are chosen so as to be large enough to provide a long path length for any moisture to have to travel to get to the crimpable connector 70 from the skirt 92 edges. The skirt 92 is made thick enough to allow same to comply to the contours of the joint components as assembled.

Stem 96 has a bore 98 extending through it of varying diameters to permit stem 96 to intimately engage the particular crimpable connector 70 being employed. Stem segment 100 has a smaller bore diameter than stem segment 102 and consequently will provide a good moisture seal for a smaller diameter crimpable connector 70 than stem segment 102. To improve the moisture seal internal "O" rings 104 are placed in the bore of stem segment 100 and internal ribs 106 are placed in the bore of stem segment 102. When stem segment 102 is to be employed the smaller stem segment 100 is first removed by cutting along recess 108. The removal of stem segment 100 makes it easier to get the stem 96 in place. The stem 96 can be provided with as many segments of decreasing bore diameter as are considered necessary to cover the full range of crimpable connectors 70 and grounding conductors to be employed.

Prior to use, the unused stem segments are removed and a grounding conductor 110 is fed through the bore 98 with a sufficient portion of the conductor extending beyond form 90. The end of conductor 110 is placed in crimpable connector 70 which is securely crimped to the conductor 110 by well-known techniques. The form 90 is now slid down the conductor 110 until the stem 96 surrounds the crimpable connector 70 and conductor 110 and the skirt 92 is positioned upon braid 56. Layers of jacketing tape 112 can now be wound about the form 90, the braid 56 and the jacket 28 ends to provide a protected joint (FIG. 4(D)). The tape 112 is pulled tight enough to displace the "O" rings 94 into sealing position. Alternatively a mastic tape 114 can be placed about the joint and kneaded into desired position. Heat shrink-type tape and similar sealing materials could also be used to complete the joint.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. A surface mounted grounding device for coupling a grounding conductor to the shield of a jacketed high-voltage electrical cable comprising metallic contact means for engaging and making electrical contact with the bared portion of the electrically conductive shield of a jacketed high-voltage electrical cable from which a portion of the jacket has been removed; coupling means connected to said contact means for receiving and making electrical contact with a grounding conductor; a conformable preformed liquid sealing form positioned over at least a portion of said contact means, said coupling means and adjacent one end of said grounding conductor; and flexible sealing means for tightly uniting said preformed liquid sealing form about said contact means, said grounding conductor and said coupling means to provide a liquid-tight seal about the joint between said grounding conductor and said electrically conductive shield of a jacketed high-voltage electrical cable.

2. A surface mounted grounding device as defined in claim 1, wherein said liquid sealing form has a skirt portion to overlie said contact means and a stem portion having a bore therethrough for receiving said grounding conductor.

3. A surface mounted grounding device as defined in claim 2, wherein said skirt portion of siad liquid sealing form has at least one raised "O" ring section.

4. A surface mounted grounding device as defined in claim 2, wherein said stem portion has a plurality of selectively removable longitudinal sections of differing radial dimensions to permit the acceptance and sealing of grounding conductors of different diameters.

5. A surface mounted grounding device as defined in claim 2, wherein said skirt portion of said liquid sealing form has at least one raised "O" ring section and said stem portion has a plurality of selectively removable longitudinal sections of differing radial dimensions to permit the acceptance and sealing of grounding conductors of different diameters.

6. A surface mounted grounding device as defined in claim 1, wherein said sealing means is an elongated tape of high dielectric material having an adhesive material affixed to one surface thereof and arranged to be wound in partially overlapping fashion over said preformed liquid sealing form, said contact means, said coupling means, said grounding conductor and said jacket of said cable.

7. A surface mounted grounding device as defined in claim 1, wherein said sealing means is an elongated tape of dielectric mastic material arranged to be wound about said preformed liquid sealing form said contact means, said coupling means, said grounding conductor and said jacket of said cable and kneaded into final configuration.

8. A surface mounted grounding device as defined in claim 1, wherein said contact means comprises a saddle of conductive material to be laid atop and in direct contact with the bared portion of the shield of a jacketed cable and an elongated copper braid wrapped about said saddle and said bared shield.

9. A surface mounted grounding device as defined in claim 8, further comprising spring clip means positioned over said copper braid to hold said copper braid in intimate contact with said bared shield.

10. A surface mounted grounding device as defined in claim 9, wherein one end of said spring clip is segmented whereby each segment can accommodate a different thickness of copper braid.

11. A surface mounted grounding device as defined in claim 10, wherein the edge of said end of said spring clip is serrated to permit same to intimately engage said copper braid.

12. A surface mounted grounding device as defined in claim 8, wherein said coupling means is a crimpable connector barrel having a first end directly connected to said saddle and a second end having a bore extending from said second end towards said first end for receipt therein of the bared end of a grounding conductor, said crimpable connector being crimped adjacent to its second end to retain the bared end of the grounding conductor inserted into said bore in said crimpable connector.

13. A surface mounted grounding device as defined in claim 8, wherein said saddle has at least one tab adjacent a first end to engage and holdd in assembly said copper braid.

14. A surface mounted grounding device as defined in claim 8, wherein said saddle has a tab at each end to engage said shield and prevent rotation of said saddle with respect to said shield.

15. The method of installing a grounding conductor to the shield of a jacketed cable without severing said shield comprising the steps of:
   (1) removing the jacket about the entire periphery of a jacketed, shielded cable for a prescribed distance along said cable to expose the shield of said cable;
   (2) positioning a contact means on said exposed shield, said contact means having a crimpable connector coupled thereto;
   (3) inserting a grounding conductor through the aperture in a preformed liquid sealing form so that a portion of said grounding conductor extends beyond same;
   (4) baring the end of said grounding conductor;
   (5) inserting the bared end of said grounding conductor into said crimpable connector and crimping said connector to said bared end of said grounding conductor;
   (6) moving said preformed liquid sealing form over said grounding conductor bared end, said crimpable connector, said contact means, said exposed shield and adjacent portions of the jacket of said cable; and
   (7) wrapping sealing means to provide a moisture-tight seal about said joint between said grounding conductor and the shield of said jacketed cable about said grounding conductor bared end, said crimpable connector, said contact means, said exposed shield and the adjacent portions of the jacket of said cable.

16. The method as defined in claim 15, including the further step of wrapping a conductive copper braid about said contact means and said exposed shield after said contact means has been positioned on said exposed shield.

17. The method as defined in claim 16, including the further step in installing a clip upon said wrapped braid after said braid has been wrapped about said contact means and said exposed shield.

* * * * *

UNITED STATES PATENT AND TRADEMARK OFFICE
CERTIFICATE OF CORRECTION

PATENT NO. : 4,696,649
DATED : September 29, 1987
INVENTOR(S) : Smorzaniuk et al.

It is certified that error appears in the above—identified patent and that said Letters Patent is hereby corrected as shown below:

Col. 1, line 58, change "resect" to --respect--

Col. 3. line 47, change "type" to --tape--.

Col. 3, line 52, after "32" insert --is--.

Col. 4, line 49, after "54a" insert --,-- (a comma).

Col. 5, line 1, after "84" insert --of--.

In the Claims:

Col. 6, line 26, change "siad" to --said--.

Col. 6, line 51, after "form" insert --,-- (a comma).

Signed and Sealed this

Twelfth Day of April, 1988

Attest:

DONALD J. QUIGG

*Attesting Officer*  *Commissioner of Patents and Trademarks*